US010062321B2

(12) United States Patent
Na et al.

(10) Patent No.: US 10,062,321 B2
(45) Date of Patent: Aug. 28, 2018

(54) PIXEL CIRCUIT AND ORGANIC LIGHT EMITTING DISPLAY DEVICE INCLUDING THE SAME

(71) Applicant: SAMSUNG DISPLAY CO., LTD., Yongin-si, Gyeonggi-do (KR)

(72) Inventors: Ji-Su Na, Yongin-si (KR); Kyoung-Jin Park, Guri-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 147 days.

(21) Appl. No.: 15/173,324

(22) Filed: Jun. 3, 2016

(65) Prior Publication Data

US 2017/0124941 A1 May 4, 2017

(30) Foreign Application Priority Data

Oct. 28, 2015 (KR) ........................ 10-2015-0150419

(51) Int. Cl.
*G06F 3/038* (2013.01)
*G09G 3/3208* (2016.01)
(Continued)

(52) U.S. Cl.
CPC ......... *G09G 3/3208* (2013.01); *G09G 3/2092* (2013.01); *G09G 3/3233* (2013.01);
(Continued)

(58) Field of Classification Search
USPC ....... 345/211, 212, 76, 80, 690, 157, 78, 82, 345/205, 208
See application file for complete search history.

(56) References Cited

U.S. PATENT DOCUMENTS

2011/0164071 A1* 7/2011 Chung ................. G09G 3/3208 345/690
2011/0273420 A1* 11/2011 Liu ...................... G09G 3/3233 345/211

(Continued)

FOREIGN PATENT DOCUMENTS

KR 2014-0170328 12/2014
KR 10-2016-0066595 6/2016

*Primary Examiner* — Thuy Pardo
(74) *Attorney, Agent, or Firm* — Lewis Roca Rothgerber Christie LLP

(57) ABSTRACT

A pixel circuit includes a first-transistor including gate-electrode receiving first emission control signal, first-electrode connected to ELVDD, and second-electrode connected to first node, a second-transistor including gate-electrode receiving second emission control signal, first-electrode, and second-electrode connected to second node, a third-transistor including gate-electrode connected to third node, first-electrode connected to first node, and second-electrode connected to first-electrode of the second-transistor, an OLED including anode connected to second node and cathode connected to ELVSS, a fourth-transistor including gate-electrode receiving bias scan signal, first-electrode connected to initialization voltage, and second-electrode connected to second node, a fifth-transistor including gate-electrode receiving bias scan signal, first-electrode connected to reference voltage, and second-electrode connected to third node, a sixth-transistor including gate-electrode receiving data scan signal, first-electrode receiving data signal, and second-electrode connected to third node, a storage-capacitor between first node and third node, and a hold-capacitor between ELVDD and first node.

20 Claims, 17 Drawing Sheets

(51) Int. Cl.
*G09G 3/20* (2006.01)
*G09G 3/3233* (2016.01)

(52) U.S. Cl.
CPC ................ *G09G 2300/043* (2013.01); *G09G 2300/0819* (2013.01); *G09G 2300/0852* (2013.01); *G09G 2300/0861* (2013.01); *G09G 2320/045* (2013.01); *G09G 2330/028* (2013.01)

(56) References Cited

U.S. PATENT DOCUMENTS

| | | | | | |
|---|---|---|---|---|---|
| 2012/0139961 | A1* | 6/2012 | Choi | H05B 33/0896 | 345/690 |
| 2013/0120228 | A1* | 5/2013 | Yoon | G09G 3/3291 | 345/80 |
| 2013/0141316 | A1* | 6/2013 | Lee | G09G 3/3266 | 345/76 |
| 2014/0111404 | A1* | 4/2014 | Omata | H05B 33/08 | 345/76 |
| 2014/0111557 | A1* | 4/2014 | Omata | G09G 3/3233 | 345/690 |
| 2014/0118409 | A1* | 5/2014 | Jun | G09G 5/02 | 345/690 |
| 2014/0145947 | A1* | 5/2014 | Yang | G06F 3/017 | 345/157 |
| 2014/0184481 | A1* | 7/2014 | Kim | G09G 3/3233 | 345/82 |
| 2014/0354621 | A1* | 12/2014 | Shin | G09G 3/3696 | 345/212 |
| 2015/0199932 | A1* | 7/2015 | Ohara | G09G 3/3233 | 345/212 |
| 2015/0371589 | A1* | 12/2015 | Kim | G09G 3/3258 | 345/208 |
| 2016/0035276 | A1* | 2/2016 | Yin | G09G 3/3233 | 345/78 |
| 2016/0042691 | A1* | 2/2016 | Na | G09G 3/3266 | 345/205 |
| 2016/0042694 | A1* | 2/2016 | Lim | G09G 3/3233 | 345/78 |
| 2017/0206747 | A1* | 7/2017 | Miller | G07F 17/3293 | 345/212 |

* cited by examiner

PIXEL CIRCUIT AND ORGANIC LIGHT EMITTING DISPLAY DEVICE INCLUDING THE SAME

CROSS-REFERENCE TO RELATED APPLICATION(S)

This application claims priority to and the benefit of Korean Patent Application No. 10-2015-0150419, filed on Oct. 28, 2015 in the Korean Intellectual Property Office (KIPO), the entire content of which is incorporated herein in its entirety by reference.

BACKGROUND

1. Technical Field

Aspects of example embodiments of the present invention relate to a display device.

2. Description of the Related Art

Recently, organic light emitting display devices have been widely used as display devices included in electronic devices. Organic light emitting display devices may be driven by an analog driving technique that implements (e.g., displays) a specific gray-scale based on a voltage stored in a storage capacitor of each pixel circuit or by a digital driving technique that divides one frame into a plurality of sub-frames and implements a specific gray-scale based on a sum of emission times of the sub-frames.

In organic light emitting display devices employing the analog driving technique, image quality degradation due to threshold voltage deviation of driving transistors included in pixel circuits may occur. Thus, the organic light emitting display device employing the analog driving technique may compensate for the threshold voltage deviation of the driving transistors included in the pixel circuits.

For example, an organic light emitting display device may perform a threshold voltage compensation operation by diode-connecting a driving transistor of each pixel circuit (e.g., a 7T-1C pixel circuit including seven transistors and one capacitor) in a threshold voltage compensation period. However, because a length (or, time) of one horizontal period 1H becomes shorter as a size of the organic light emitting display device becomes bigger (e.g., as resolution of the organic light emitting display device becomes higher), the organic light emitting display device has limits to increase a compensation time for which the threshold voltage compensation operation is performed in each pixel circuit.

The above information discussed in this Background section is only for enhancement of understanding of the background of the described technology and therefore it may contain information that does not constitute prior art that is already known to a person having ordinary skill in the art.

SUMMARY

Aspects of example embodiments of the present invention relate to a display device. For example, some example embodiments of the present invention relate to a pixel circuit that performs an initialization operation and a threshold voltage compensation operation and an organic light emitting display device including the pixel circuit.

Some example embodiments provide a pixel circuit that can relatively easily adjust a compensation time for which a threshold voltage compensation operation is performed.

Some example embodiments provide an organic light emitting display device that can display (e.g., output) a high-quality image by including the pixel circuit.

According to some example embodiments of the present invention, a pixel circuit may include: a first transistor including a gate electrode configured to receive a first emission control signal, a first electrode connected to a high power voltage, and a second electrode connected to a first node; a second transistor including a gate electrode configured to receive a second emission control signal, a first electrode, and a second electrode connected to a second node; a third transistor including a gate electrode connected to a third node, a first electrode connected to the first node, and a second electrode connected to the first electrode of the second transistor; an organic light emitting diode including an anode connected to the second node and a cathode connected to a low power voltage; a fourth transistor including a gate electrode configured to receive a bias scan signal, a first electrode connected to an initialization voltage, and a second electrode connected to the second node; a fifth transistor including a gate electrode configured to receive the bias scan signal, a first electrode connected to a reference voltage, and a second electrode connected to the third node; a sixth transistor including a gate electrode configured to receive a data scan signal, a first electrode configured to receive a data signal, and a second electrode connected to the third node; a storage capacitor between the first node and the third node; and a hold capacitor between the high power voltage and the first node.

According to some example embodiments, an initialization period, a threshold voltage compensation period, a data scan period, an emission preparation period, and an emission period are sequentially determined based on the bias scan signal, the data scan signal, the first emission control signal, and the second emission control signal, and a length of the initialization period, a length of the threshold voltage compensation period, a length of the data scan period, a length of the emission preparation period, and a length of the emission period are adjusted based on timings of the bias scan signal, the data scan signal, the first emission control signal, and the second emission control signal.

According to some example embodiments, the first through sixth transistors are p-type metal oxide semiconductor (PMOS) transistors.

According to some example embodiments, the bias scan signal has a logical 'low' level, the data scan signal has a logical 'high' level, the first emission control signal has a logical 'low' level, and the second emission control signal has a logical 'low' level in the initialization period.

According to some example embodiments, the first transistor, the second transistor, the fourth transistor, and the fifth transistor are configured to be turned on and the sixth transistor is configured to be turned off in the initialization period.

According to some example embodiments, the bias scan signal has a logical 'low' level, the data scan signal has a logical 'high' level, the first emission control signal has a logical 'high' level, and the second emission control signal has a logical 'low' level in the threshold voltage compensation period.

According to some example embodiments, the second transistor, the fourth transistor, and the fifth transistor are configured to be turned on and the first transistor and the sixth transistor are configured to be turned off in the threshold voltage compensation period.

According to some example embodiments, the bias scan signal has a logical 'high' level, the data scan signal has a logical 'low' level, the first emission control signal has a logical 'high' level, and the second emission control signal has a logical 'high' level in the data scan period.

According to some example embodiments, the first transistor, the second transistor, the fourth transistor, and the fifth transistor are configured to be turned off and the sixth transistor is configured to be turned on in the data scan period.

According to some example embodiments, the bias scan signal has a logical 'high' level, the data scan signal has a logical 'high' level, the first emission control signal has a logical 'low' level, and the second emission control signal has a logical 'high' level in the emission preparation period.

According to some example embodiments, the first transistor is configured to be turned on and the second transistor, the fourth transistor, the fifth transistor, and the sixth transistor are configured to be turned off in the emission preparation period.

According to some example embodiments, the bias scan signal has a logical 'high' level, the data scan signal has a logical 'high' level, the first emission control signal has a logical 'low' level, and the second emission control signal has a logical 'low' level in the emission period.

According to some example embodiments, the first transistor and the second transistor are configured to be turned on and the fourth transistor, the fifth transistor, and the sixth transistor are configured to be turned off in the emission period.

According to some example embodiments of the present invention, an organic light emitting display device includes: a display panel including a plurality of pixel circuits, each of the pixel circuits operating based on sequential operation periods that include an initialization period, a threshold voltage compensation period, a data scan period, an emission preparation period, and an emission period; a data driver configured to provide a data signal to the pixel circuits; a scan driver configured to provide a bias scan signal and a data scan signal to the pixel circuits, logical levels of the bias scan signal and the data scan signal being determined respectively according to the operation periods; an emission driver configured to provide a first emission control signal and a second emission control signal to the pixel circuits, logical levels of the first emission control signal and the second emission control signal being determined respectively according to the operation periods; a timing controller configured to control the data driver, the scan driver, and the emission driver; and a power supply configured to supply the pixel circuits with a reference voltage, an initialization voltage, a high power voltage, and a low power voltage, wherein a length of the initialization period, a length of the threshold voltage compensation period, a length of the data scan period, a length of the emission preparation period, and a length of the emission period are adjusted based on timings of the bias scan signal, the data scan signal, the first emission control signal, and the second emission control signal.

According to some example embodiments, the each of the pixel circuits includes: a first transistor including a gate electrode configured to receive the first emission control signal, a first electrode connected to the high power voltage, and a second electrode connected to a first node; a second transistor including a gate electrode configured to receive the second emission control signal, a first electrode, and a second electrode connected to a second node; a third transistor including a gate electrode connected to a third node, a first electrode connected to the first node, and a second electrode connected to the first electrode of the second transistor; an organic light emitting diode including an anode connected to the second node and a cathode connected to the low power voltage; a fourth transistor including a gate electrode configured to receive the bias scan signal, a first electrode connected to the initialization voltage, and a second electrode connected to the second node; a fifth transistor including g a gate electrode configured to receive the bias scan signal, a first electrode connected to the reference voltage, and a second electrode connected to the third node; a sixth transistor including a gate electrode configured to receive the data scan signal, a first electrode configured to receive the data signal, and a second electrode connected to the third node; a storage capacitor between the first node and the third node; and a hold capacitor between the high power voltage and the first node, and wherein the first through sixth transistors are p-type metal oxide semiconductor (PMOS) transistors.

According to some example embodiments, the bias scan signal has a logical 'low' level, the data scan signal has a logical 'high' level, the first emission control signal has a logical 'low' level, and the second emission control signal has a logical 'low' level in the initialization period.

According to some example embodiments, the bias scan signal has a logical 'low' level, the data scan signal has a logical 'high' level, the first emission control signal has a logical 'high' level, and the second emission control signal has a logical 'low' level in the threshold voltage compensation period.

According to some example embodiments, the bias scan signal has a logical 'high' level, the data scan signal has a logical 'low' level, the first emission control signal has a logical 'high' level, and the second emission control signal has a logical 'high' level in the data scan period.

According to some example embodiments, the bias scan signal has a logical 'high' level, the data scan signal has a logical 'high' level, the first emission control signal has a logical 'low' level, and the second emission control signal has a logical 'high' level in the emission preparation period.

According to some example embodiments, the bias scan signal has a logical 'high' level, the data scan signal has a logical 'high' level, the first emission control signal has a logical 'low' level, and the second emission control signal has a logical 'low' level in the emission period.

Therefore, a pixel circuit according to some example embodiments of the present invention may sequentially determine an initialization period, a threshold voltage compensation period, a data scan period, an emission preparation period, and an emission period based on a bias scan signal, a data scan signal, a first emission control signal, and a second emission control signal and may relatively easily adjust a length of the initialization period, a length of the threshold voltage compensation period, a length of the data scan period, a length of the emission preparation period, and a length of the emission period (e.g., may relatively easily adjust a compensation time for which a threshold voltage compensation operation is performed) based on timings of the bias scan signal, the data scan signal, the first emission control signal, and the second emission control signal.

In addition, an organic light emitting display device including the pixel circuit according to some example embodiments of the present invention may display (e.g., output) a high-quality image.

BRIEF DESCRIPTION OF THE DRAWINGS

Illustrative, non-limiting example embodiments of the present invention will be more clearly understood from the following detailed description taken in conjunction with the accompanying drawings.

DETAILED DESCRIPTION OF THE EMBODIMENTS

Figure 1:
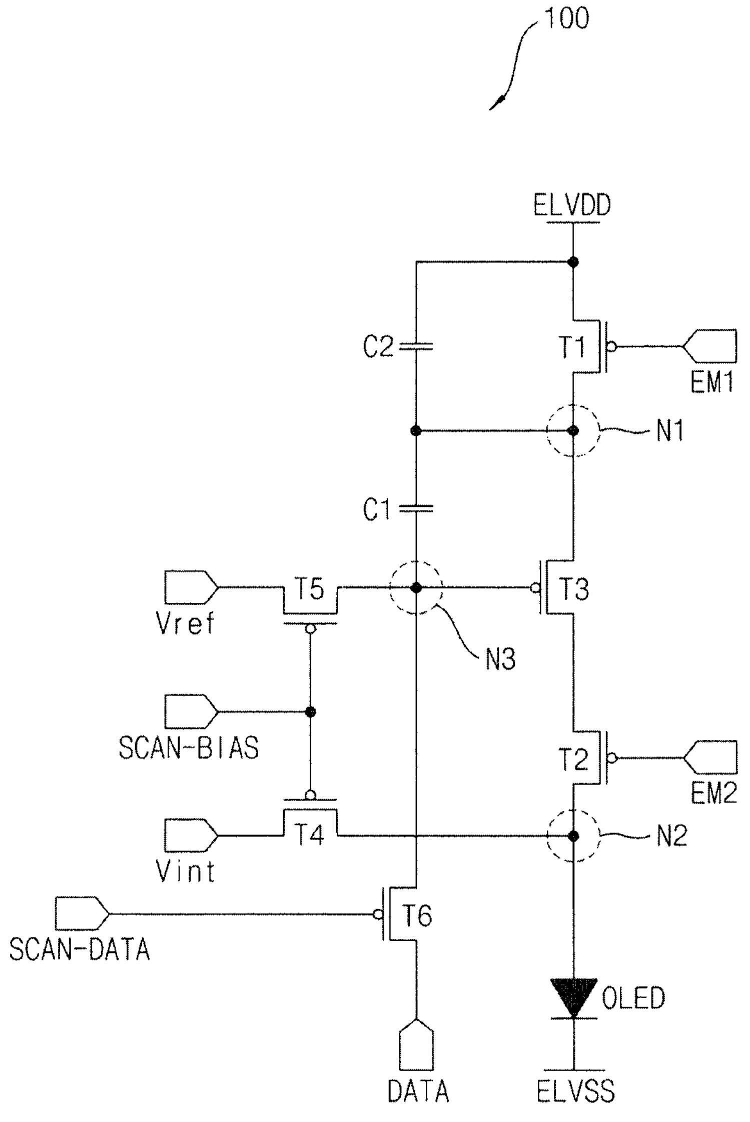
FIG. 1 is a circuit diagram illustrating a pixel circuit according to some example embodiments of the present invention.

Hereinafter, aspects of one or more example embodiments of the present invention will be explained in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
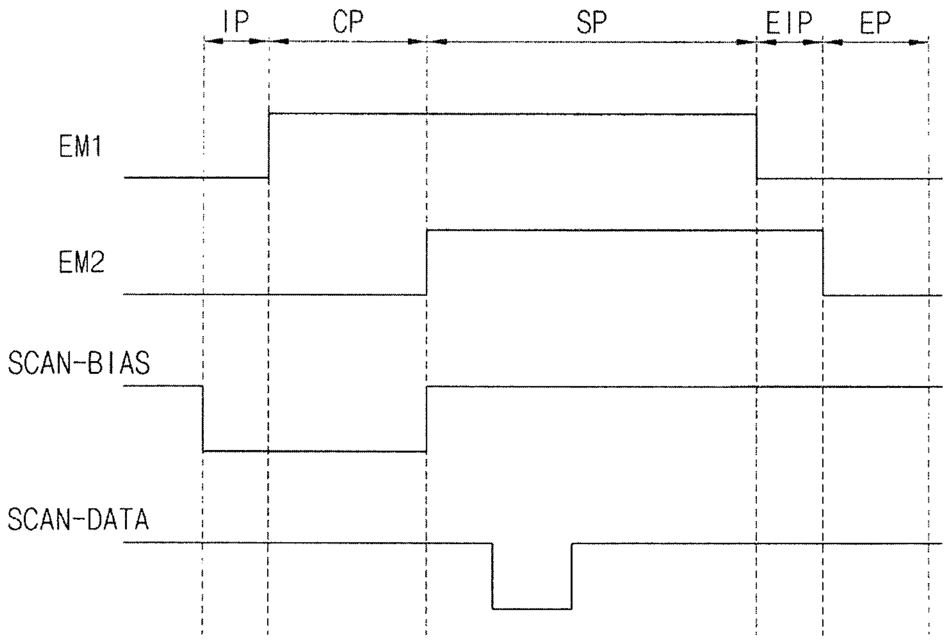
FIG. 2 is a waveform diagram illustrating an initialization period, a threshold voltage compensation period, a data scan period, an emission preparation period, and an emission period of the pixel circuit of FIG. 1.
Figure 3:
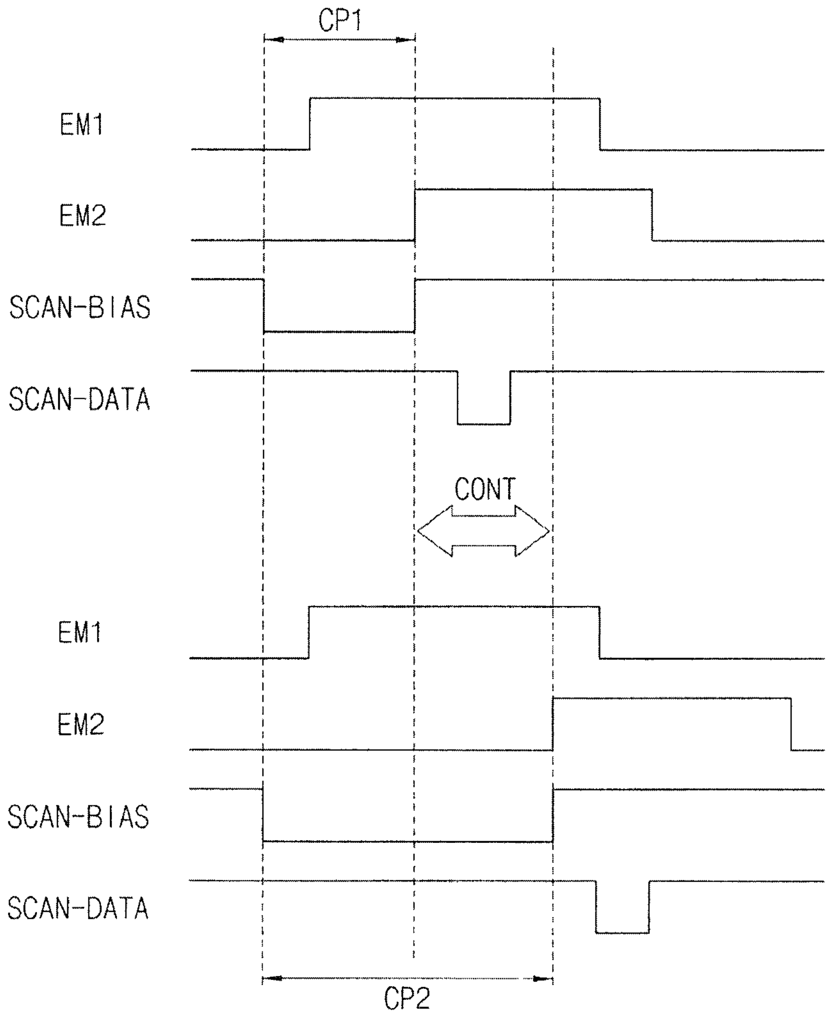
FIG. 3 is a waveform diagram illustrating an example in which a threshold voltage compensation period of the pixel circuit of FIG. 1 is adjusted.

FIG. 1 is a circuit diagram illustrating a pixel circuit according to example embodiments. FIG. 2 is a waveform diagram illustrating an initialization period, a threshold voltage compensation period, a data scan period, an emission preparation period, and an emission period of the pixel circuit of FIG. 1. FIG. 3 is a waveform diagram illustrating an example in which a threshold voltage compensation period of the pixel circuit of FIG. 1 is adjusted.

Referring to FIGS. 1 through 3, the pixel circuit 100 may include a first transistor T1, a second transistor T2, a third transistor T3, a fourth transistor T4, a fifth transistor T5, a sixth transistor T6, an organic light emitting diode OLED, a storage capacitor C1, and a hold capacitor C2. That is, because the pixel circuit 100 may include six transistors T1 through T6 and two capacitors C1 and C2, the pixel circuit 100 may be referred to as a 6T-2C pixel circuit.

The first transistor T1 may include a gate electrode (or, gate terminal) to which a first emission control signal EM1 is applied, a first electrode (or, first terminal) connected to a high power voltage ELVDD, and a second electrode (or, second terminal) connected to a first node N1. As illustrated in FIG. 1, because a first electrode of the third transistor T3 and a first electrode of the storage capacitor C1 are connected to the first node N1, the second electrode of the first transistor T1 may be connected to the first electrode of the third transistor T3 and the first electrode of the storage capacitor C1.

Here, because the first transistor T1 operates based on the first emission control signal EM1, the first transistor T1 may be referred to as a first emission control transistor. In an example embodiment, as illustrated in FIG. 1, the first transistor T1 may be a p-type metal oxide semiconductor (PMOS) transistor. In this case, when the first emission control signal EM1 has a logical 'high' level, the first transistor T1 may be turned off. On the other hand, when the first emission control signal EM1 has a logical 'low' level, the first transistor T1 may be turned on.

In another example embodiment, the first transistor T1 may be an n-type metal oxide semiconductor (NMOS) transistor. In this case, when the first emission control signal EM1 has a logical 'high' level, the first transistor T1 may be turned on. On the other hand, when the first emission control signal EM1 has a logical 'low' level, the first transistor T1 may be turned off.

The second transistor T2 may include a gate electrode to which a second emission control signal EM2 is applied, a first electrode connected to a second electrode of the third transistor T3, and a second electrode connected to a second node N2. As illustrated in FIG. 1, because a second electrode of the fourth transistor T4 and an anode of the organic light emitting diode OLED are connected to the second node N2, the second electrode of the second transistor T2 may be connected to the second electrode of the fourth transistor T4 and the anode of the organic light emitting diode OLED.

Here, because the second transistor T2 operates based on the second emission control signal EM2, the second transistor T2 may be referred to as a second emission control transistor. In an example embodiment, as illustrated in FIG. 1, the second transistor T2 may be a PMOS transistor. In this case, when the second emission control signal EM2 has a logical 'high' level, the second transistor T2 may be turned off. On the other hand, when the second emission control signal EM2 has a logical 'low' level, the second transistor T2 may be turned on. In another example embodiment, the second transistor T2 may be an NMOS transistor. In this case, when the second emission control signal EM2 has a logical 'high' level, the second transistor T2 may be turned on. On the other hand, when the second emission control signal EM2 has a logical 'low' level, the second transistor T2 may be turned off.

The third transistor T3 may include a gate electrode connected to a third node N3, the first electrode connected to the first node N1, and the second electrode connected to the first electrode of the second transistor T2. As illustrated in FIG. 1, because a second electrode of the storage capacitor C1, a second electrode of the fifth transistor T5, and a second electrode of the sixth transistor T6 are connected to the third node N3, the gate electrode of the third transistor T3 may be connected to the second electrode of the storage capacitor C1, the second electrode of the fifth transistor T5, and the second electrode of the sixth transistor T6. Here, the third transistor T3 may be referred to as a driving transistor.

For example, the third transistor T3 may control a current flowing through the organic light emitting diode OLED based on a voltage applied to the gate electrode of the third transistor T3 (e.g., a voltage applied to the third node N3). In other words, the third transistor T3 may control emission-luminance of the organic light emitting diode OLED to implement a specific gray-scale. In an example embodiment, as illustrated in FIG. 1, the third transistor T3 may be a PMOS transistor.

In this case, when the voltage applied to the third node N3 has a logical 'high' level that is higher than a 'turn-on' level of the third transistor T3, the third transistor T3 may be turned off. On the other hand, when the voltage applied to the third node N3 has a logical 'low' level that is lower than the 'turn-on' level of the third transistor T3, the third transistor T3 may be turned on. In another example embodiment, the third transistor T3 may be an NMOS transistor. In this case, when the voltage applied to the third node N3 has a logical 'high' level that is higher than the 'turn-on' level of the third transistor T3, the third transistor T3 may be turned on. On the other hand, when the voltage applied to the third node N3 has a logical 'low' level that is lower than the 'turn-on' level of the third transistor T3, the third transistor T3 may be turned off.

The fourth transistor T4 may include a gate electrode to which a bias scan signal SCAN-BIAS is applied, a first electrode connected to an initialization voltage Vint, and the second electrode connected to the second node N2. As illustrated in FIG. 1, because the second electrode of the fourth transistor T4 is connected to the second node N2, the initialization voltage Vint may be transferred to the second node N2 when the fourth transistor T4 is turned on in response to the bias scan signal SCAN-BIAS.

Here, because the fourth transistor T4 operates based on the bias scan signal SCAN-BIAS, the fourth transistor T4 may be referred to as a first bias transistor. In addition, the gate electrode of the fourth transistor T4 is connected to a gate electrode of the fifth transistor T5, the fourth transistor T4 and the fifth transistor T5 may be concurrently turned on or off in response to the bias scan signal SCAN-BIAS. In an example embodiment, as illustrated in FIG. 1, the fourth transistor T4 may be a PMOS transistor. In this case, when the bias scan signal SCAN-BIAS has a logical 'high' level, the fourth transistor T4 may be turned off. On the other hand, when the bias scan signal SCAN-BIAS has a logical 'low' level, the fourth transistor T4 may be turned on.

In another example embodiment, the fourth transistor T4 may be an NMOS transistor. In this case, when the bias scan signal SCAN-BIAS has a logical 'high' level, the fourth transistor T4 may be turned on. On the other hand, when the bias scan signal SCAN-BIAS has a logical 'low' level, the fourth transistor T4 may be turned off.

The fifth transistor T5 may include the gate electrode to which the bias scan signal SCAN-BIAS is applied, a first electrode connected to a reference voltage Vref, and the second electrode connected to the third node N3. As illustrated in FIG. 1, because the second electrode of the fifth transistor T5 is connected to the third node N3, the reference voltage Vref may be transferred to the third node N3 when the fifth transistor T5 is turned on in response to the bias scan signal SCAN-BIAS. Here, because the fifth transistor T5 operates based on the bias scan signal SCAN-BIAS, the fifth transistor T5 may be referred to as a second bias transistor. In addition, because the gate electrode of the fifth transistor T5 is connected to the gate electrode of the fourth transistor T4, the fifth transistor T5 and the fourth transistor T4 may be concurrently turned on or off in response to the bias scan signal SCAN-BIAS.

In an example embodiment, as illustrated in FIG. 1, the fifth transistor T5 may be a PMOS transistor. In this case, when the bias scan signal SCAN-BIAS has a logical 'high' level, the fifth transistor T5 may be turned off. On the other hand, when the bias scan signal SCAN-BIAS has a logical 'low' level, the fifth transistor T5 may be turned on.

In another example embodiment, the fifth transistor T5 may be an NMOS transistor. In this case, when the bias scan signal SCAN-BIAS has a logical 'high' level, the fifth transistor T5 may be turned on. On the other hand, when the bias scan signal SCAN-BIAS has a logical 'low' level, the fifth transistor T5 may be turned off.

The sixth transistor T6 may include a gate electrode to which a data scan signal SCAN-DATA is applied, a first electrode to which a data signal DATA is applied, and the second electrode connected to the third node N3. As illustrated in FIG. 1, because the second electrode of the sixth transistor T6 is connected to the third node N3, the data signal DATA (e.g., a data voltage) may be transferred to the third node N3 when the sixth transistor T6 is turned on in response to the data scan signal SCAN-DATA.

In an example embodiment, as illustrated in FIG. 1, the sixth transistor T6 may be a PMOS transistor. In this case, when the data scan signal SCAN-DATA has a logical 'high' level, the sixth transistor T6 may be turned off. On the other hand, when the data scan signal SCAN-DATA has a logical 'low' level, the sixth transistor T6 may be turned on.

In another example embodiment, the sixth transistor T6 may be an NMOS transistor. In this case, when the data scan signal SCAN-DATA has a logical 'high' level, the sixth transistor T6 may be turned on. On the other hand, when the data scan signal SCAN-DATA has a logical 'low' level, the sixth transistor T6 may be turned off. As described above, the pixel circuit 100 may include six transistors T1 through T6, and each of the transistors T1 through T6 may be a PMOS transistor or an NMOS transistor. Hereinafter, for convenience of description, it will be assumed that the first through sixth transistors T1 through T6 included in the pixel circuit 100 are PMOS transistors.

The organic light emitting diode OLED may include the anode connected to the second node N2 and a cathode connected to a low power voltage ELVSS. As illustrated in FIG. 1, because the second electrode of the second transistor T2 and the second electrode of the fourth transistor T4 are connected to the second node N2, the anode of the organic light emitting diode OLED may be connected to the second electrode of the second transistor T2 and the second electrode of the fourth transistor T4.

The storage capacitor C1 may be connected between the first node N1 and the third node N3. That is, the first electrode of the storage capacitor C1 may be connected to the first node N1, and the second electrode of the storage capacitor C1 may be connected to the third node N3. The hold capacitor C2 may be connected between the high power voltage ELVDD and the first node N1. That is, the first electrode of the hold capacitor C2 may be connected to the high power voltage ELVDD, and the second electrode of the hold capacitor C2 may be connected to the first node N1.

As a result, a capacitor configuration of the pixel circuit 100 may be changed according to whether the first transistor T1 is turned on or off. For example, when the first transistor T1 is turned off in response to the first emission control signal EM1, the storage capacitor C1 and the hold capacitor C2 may exist between the high power voltage ELVDD and the third node N3. Hence, a voltage change of the third node N3 may be distributed by the storage capacitor C1 and the hold capacitor C2, and thus only a portion of the voltage change of the third node N3 may be reflected in a voltage of the first node N1. On the other hand, when the first transistor T1 is turned on in response to the first emission control signal EM1, only the storage capacitor C1 may exist between the high power voltage ELVDD and the third node N3. Hence, a voltage change of the first node N1 may be directly reflected in a voltage of the third node N3.

As illustrated in FIG. 2, an initialization period IP, a threshold voltage compensation period CP, a data scan period SP, an emission preparation period EIP, and an emission period EP may be sequentially determined based on the bias scan signal SCAN-BIAS, the data scan signal SCAN-DATA, the first emission control signal EM1, and the second emission control signal EM2. For example, in the initialization period IP, the bias scan signal SCAN-BIAS may have a logical 'low' level, the data scan signal SCAN-DATA may have a logical 'high' level, the first emission control signal EM1 may have a logical 'low' level, and the second emission control signal EM2 may have a logical 'low' level. Thus, in the initialization period, the first transistor T1, the second transistor T2, the fourth transistor T4, and the fifth transistor T5 may be turned on, and the sixth transistor T6 may be turned off.

Subsequently, in the threshold voltage compensation period CP, the bias scan signal SCAN-BIAS may have a logical 'low' level, the data scan signal SCAN-DATA may have a logical 'high' level, the first emission control signal EM1 may have a logical 'high' level, and the second emission control signal EM2 may have a logical 'low' level. Thus, in the threshold voltage compensation period CP, the second transistor T2, the fourth transistor T4, and the fifth transistor T5 may be turned on, and the first transistor T1 and the sixth transistor T6 may be turned off.

Next, in the data scan period SP, the bias scan signal SCAN-BIAS may have a logical 'high' level, the data scan signal SCAN-DATA may have a logical 'low' level, the first emission control signal EM1 may have a logical 'high' level, and the second emission control signal EM2 may have a logical 'high' level. Thus, in the data scan period SP, the first transistor T1, the second transistor T2, the fourth transistor T4, and the fifth transistor T5 may be turned off, and the sixth transistor T6 may be turned on.

Subsequently, in the emission preparation period EIP, the bias scan signal SCAN-BIAS may have a logical 'high' level, the data scan signal SCAN-DATA may have a logical 'high' level, the first emission control signal EM1 may have a logical 'low' level, and the second emission control signal EM2 may have a logical 'high' level. Thus, in the emission preparation period EIP, the first transistor T1 may be turned on, and the second transistor T2, the fourth transistor T4, the fifth transistor T5, and the sixth transistor T6 may be turned off.

Next, in the emission period EP, the bias scan signal SCAN-BIAS may have a logical 'high' level, the data scan signal SCAN-DATA may have a logical 'high' level, the first emission control signal EM1 may have a logical 'low' level, and the second emission control signal EM2 may have a logical 'low' level. Thus, in the emission period EP, the first transistor T1 and the second transistor T2 may be turned on, and the fourth transistor T4, the fifth transistor T5, and the sixth transistor T6 may be turned off. With reference to FIGS. 4 through 9B, the initialization period IP, the threshold voltage compensation period CP, the data scan period SP, the emission preparation period EIP, and the emission period EP will be described in detail.

As described above, because the initialization period IP, the threshold voltage compensation period CP, the data scan period SP, the emission preparation period EIP, and the emission period EP are determined based on the bias scan signal SCAN-BIAS, the data scan signal SCAN-DATA, the first emission control signal EM1, and the second emission control signal EM2, a length of the initialization period IP, a length of the threshold voltage compensation period CP, a length of the data scan period SP, a length of the emission preparation period EIP, and a length of the emission period EP may be adjusted by changing timings of the bias scan signal SCAN-BIAS, the data scan signal SCAN-DATA, the first emission control signal EM1, and the second emission control signal EM2.

For example, as illustrated in FIG. 3, when it is determined that the length of the threshold voltage compensation period CP of the pixel circuit 100 is shorter than a desired length, the length of the threshold voltage compensation period CP of the pixel circuit 100 may be increased (e.g., indicated by CP1→CP2) by adjusting the timings of the bias scan signal SCAN-BIAS, the data scan signal SCAN-DATA, the first emission control signal EM1, and the second emission control signal EM2 (e.g., indicated by CONT).

In brief, because the pixel circuit 100 relatively easily adjusts a compensation time for which the threshold voltage compensation operation is performed by changing the timings of the bias scan signal SCAN-BIAS, the data scan signal SCAN-DATA, the first emission control signal EM1, and the second emission control signal EM2, the pixel circuit 100 may secure a sufficient compensation time for which the threshold voltage compensation operation is performed when a length of one horizontal period 1H becomes shorter (e.g., 1÷60 Hz÷1920 line=about 8.68 μsec in case of FHD(1920×1080), 1÷60 Hz÷2560 line=about 6.51 μsec in case of QHD(2560×1440), 1÷60 Hz÷3680 line=about 4.34 μsec in case of UHD(3840×2160)) as a size of the organic light emitting display device becomes bigger (e.g., as resolution of the organic light emitting display device becomes higher).

Figure 4:
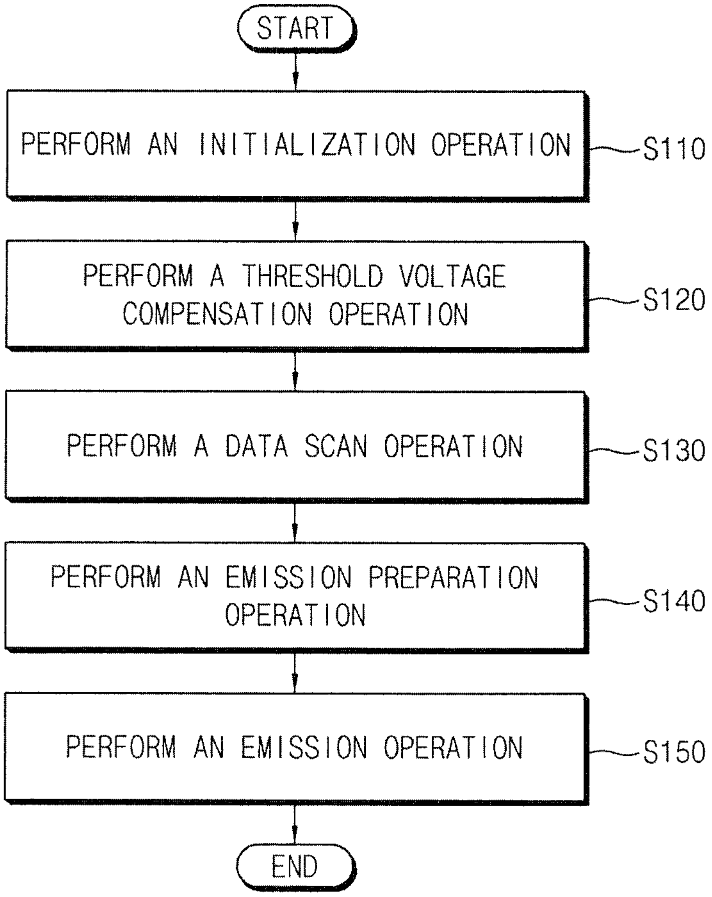
FIG. 4 is a flowchart illustrating an example in which the pixel circuit of FIG. 1 operates.
Figure 5A:
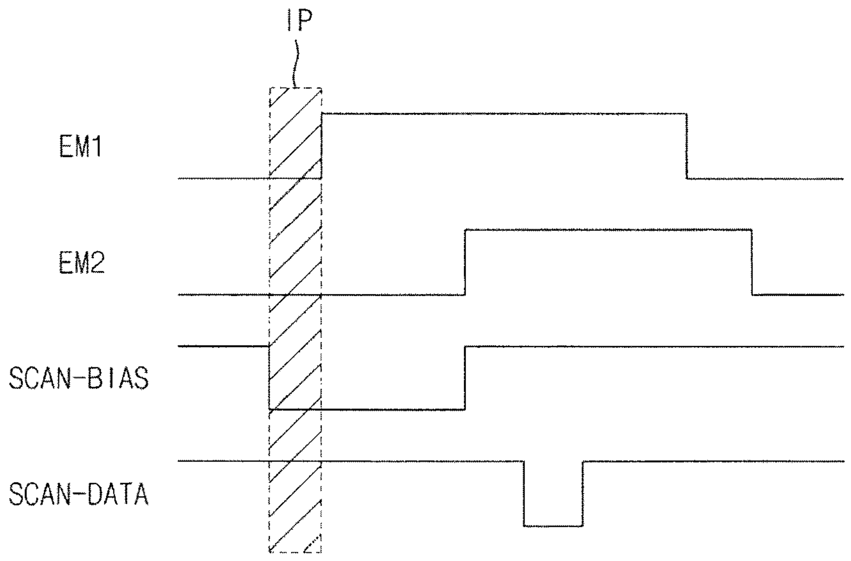
FIGS. 5A and 5B are diagrams for describing an initialization operation performed by the pixel circuit of FIG. 1.
Figure 5B:
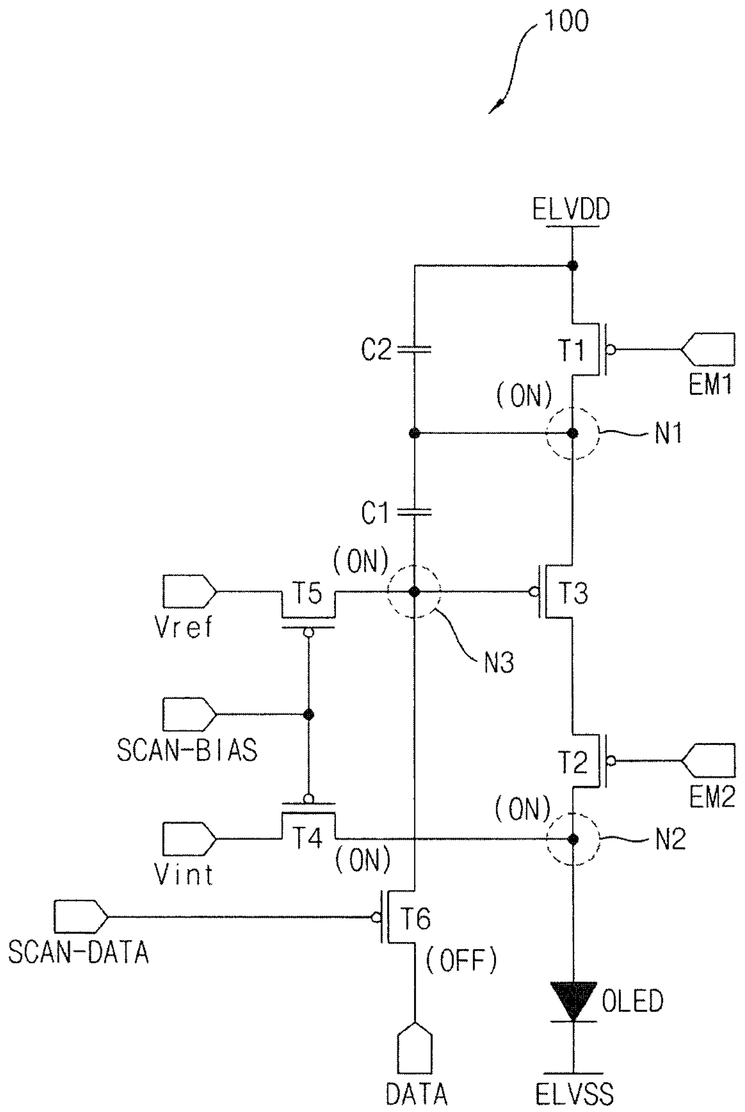
Figure 6A:
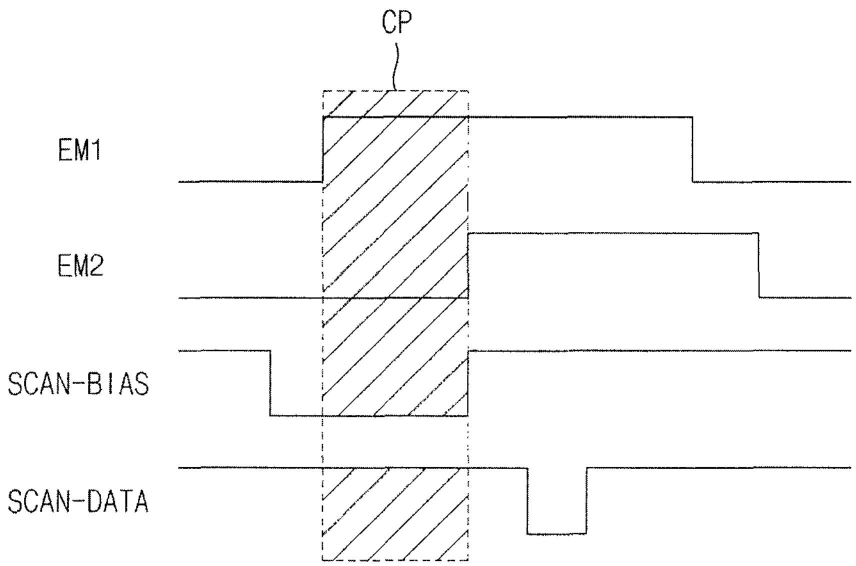
FIGS. 6A and 6B are diagrams for describing a threshold voltage compensation operation performed by the pixel circuit of FIG. 1.
Figure 6B:
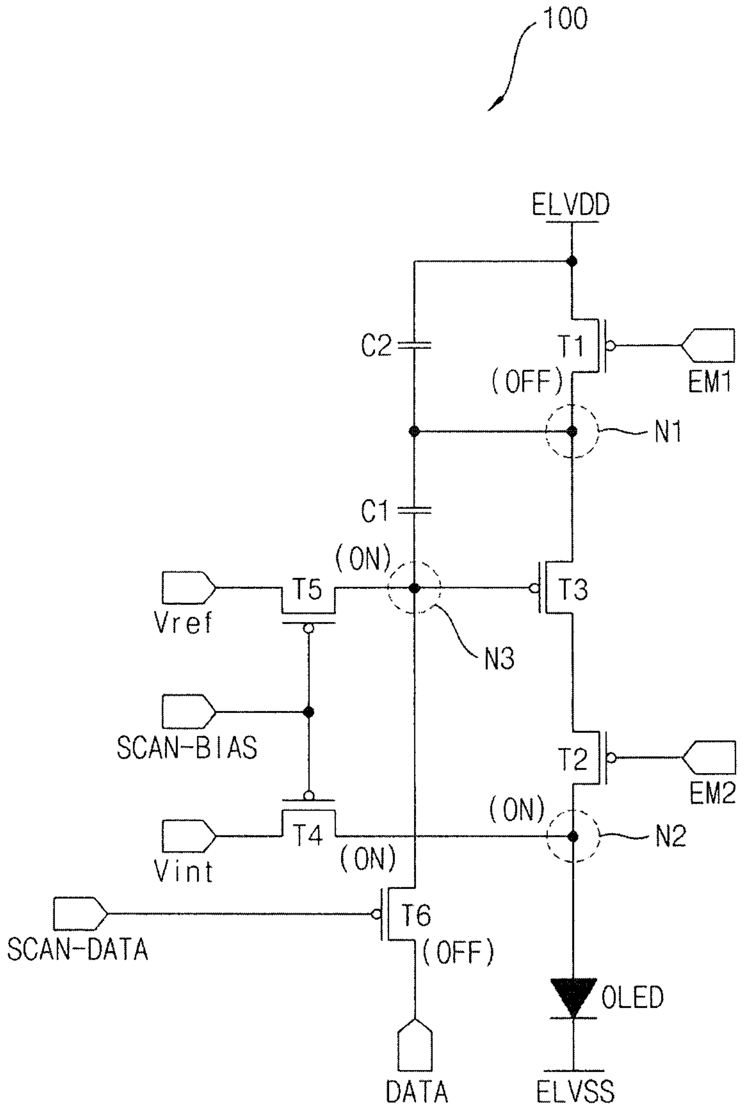
Figure 7A:
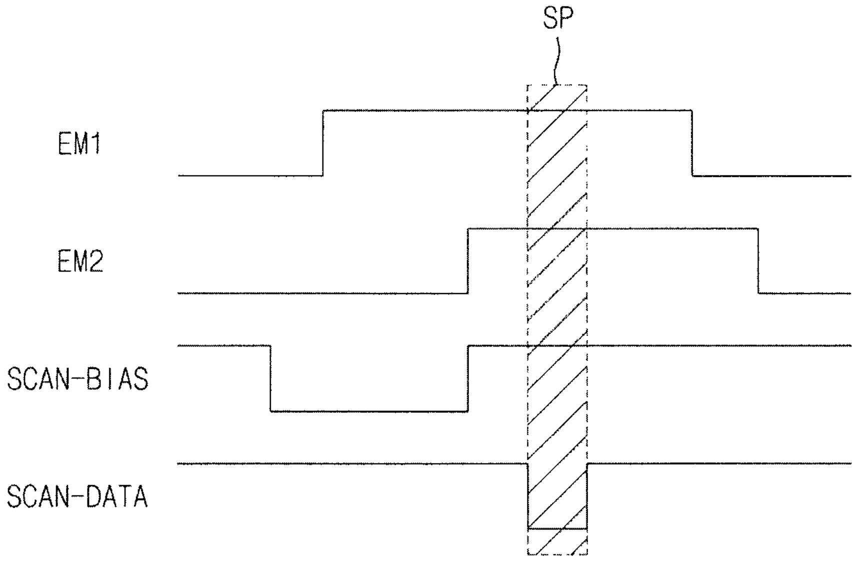
FIGS. 7A and 7B are diagrams for describing a data scan operation performed by the pixel circuit of FIG. 1.
Figure 7B:
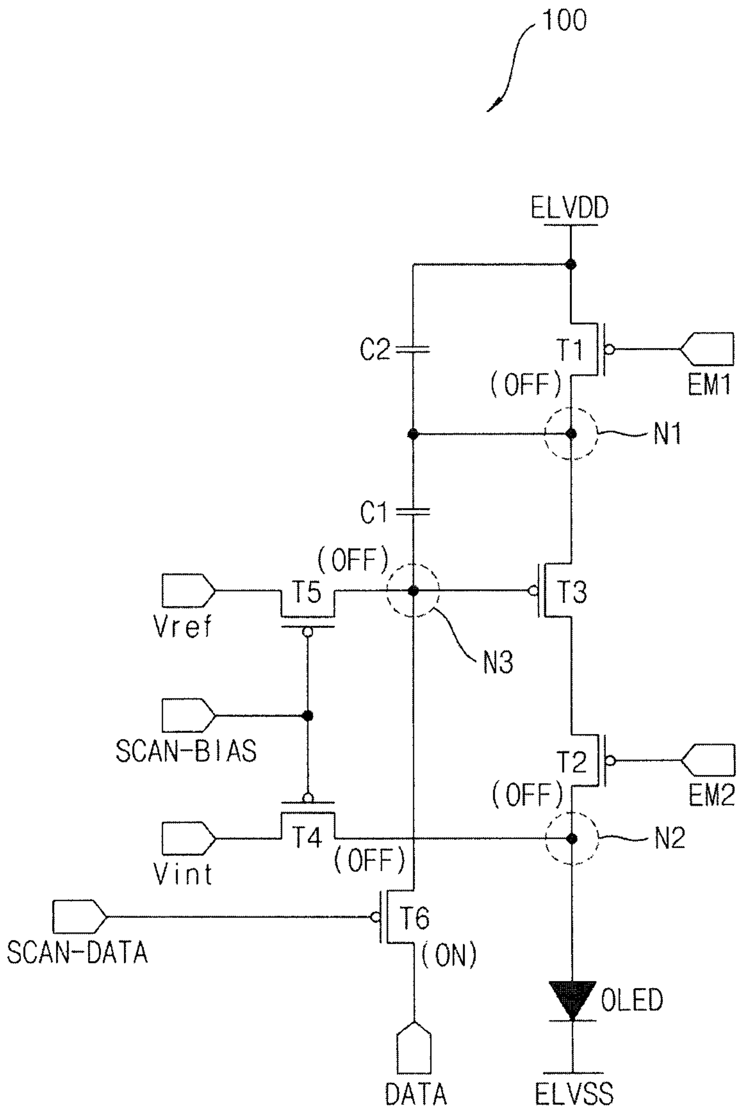
Figure 8A:
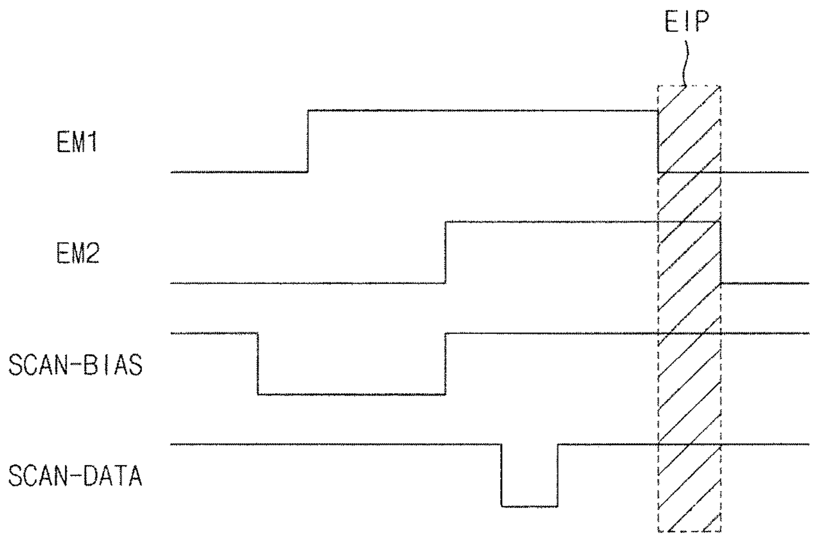
FIGS. 8A and 8B are diagrams for describing an emission preparation operation performed by the pixel circuit of FIG. 1.
Figure 8B:
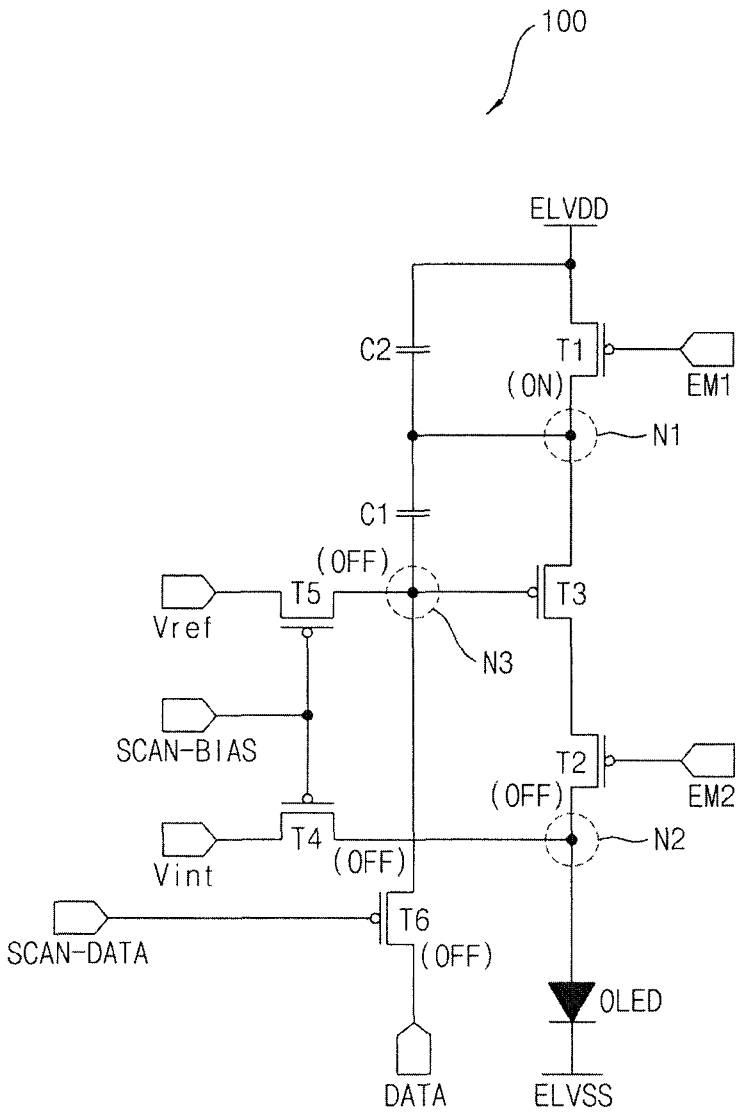
Figure 9A:
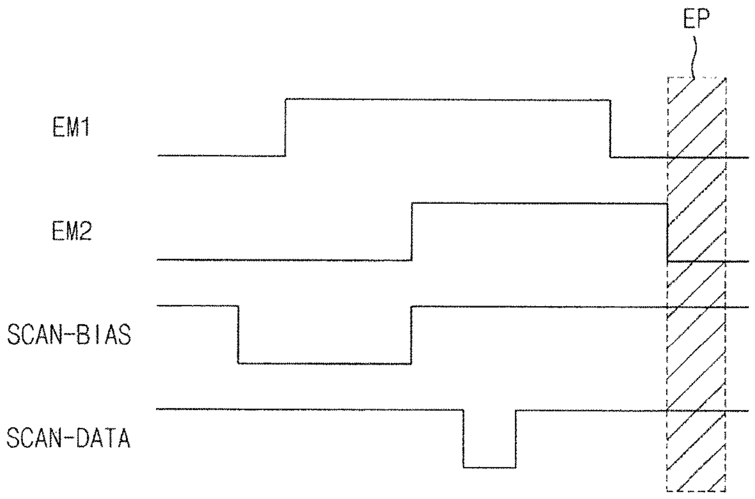
FIGS. 9A and 9B are diagrams for describing an emission operation performed by the pixel circuit of FIG. 1.
Figure 9B:
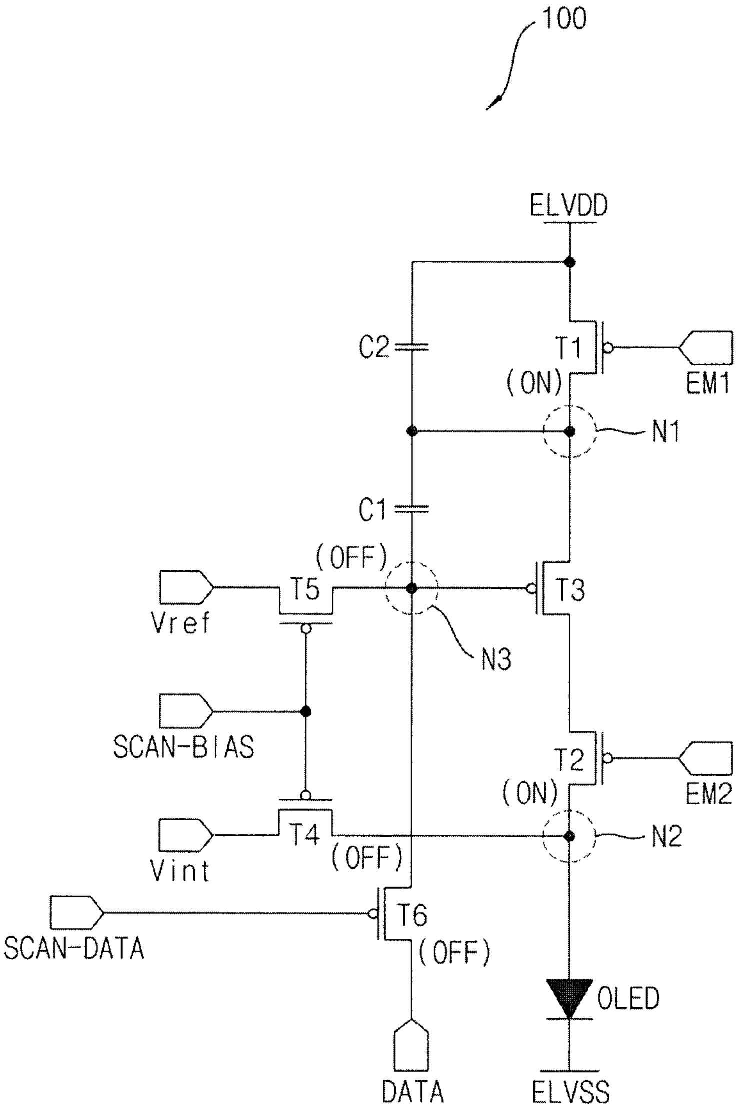

FIG. 4 is a flowchart illustrating an example in which the pixel circuit of FIG. 1 operates. FIGS. 5A and 5B are diagrams for describing an initialization operation performed by the pixel circuit of FIG. 1. FIGS. 6A and 6B are diagrams for describing a threshold voltage compensation operation performed by the pixel circuit of FIG. 1. FIGS. 7A and 7B are diagrams for describing a data scan operation performed by the pixel circuit of FIG. 1. FIGS. 8A and 8B are diagrams for describing an emission preparation operation performed by the pixel circuit of FIG. 1. FIGS. 9A and 9B are diagrams for describing an emission operation performed by the pixel circuit of FIG. 1.

Referring to FIGS. 4 through 9B, the pixel circuit 100 may perform an initialization operation in an initialization period IP (S110), may perform a threshold voltage compensation operation in a threshold voltage compensation period CP (S120), may perform a data scan operation in a data scan period SP (S130), may perform an emission preparation operation in an emission preparation period EIP (S140), and may perform an emission operation in an emission period EP (S150). Hereinafter, the initialization operation, the threshold voltage compensation operation, the data scan operation, the emission preparation operation, and the emission operation that the pixel circuit 100 sequentially performs will be described in detail.

FIGS. 5A and 5B show the initialization period IP of the pixel circuit 100. As illustrated in FIG. 5A, in the initialization period IP of the pixel circuit 100, the bias scan signal SCAN-BIAS may have a logical 'low' level, the data scan signal SCAN-DATA may have a logical 'high' level, the first emission control signal EM1 may have a logical 'low' level, and the second emission control signal EM2 may have a logical 'low' level. Thus, as illustrated in FIG. 5B, the first transistor T1 may be turned on (e.g., indicated by ON) based on the first emission control signal EM1 having a logical 'low' level, the second transistor T2 may be turned on (e.g., indicated by ON) based on the second emission control signal EM2 having a logical 'low' level, the fourth transistor T4 may be turned on (e.g., indicated by ON) based on the bias scan signal SCAN-BIAS having a logical 'low' level, the fifth transistor T5 may be turned on (e.g., indicated by ON) based on the bias scan signal SCAN-BIAS having a logical 'low' level, and the sixth transistor T6 may be turned off (e.g., indicated by OFF) based on the data scan signal SCAN-DATA having a logical 'high' level.

As a result, in the initialization period IP of the pixel circuit 100, the reference voltage Vref may be transferred to the third node N3 via the fifth transistor T5, the initialization voltage Vint may be transferred to the second node N2 via the fourth transistor T4, and the high power voltage ELVDD may be transferred to the first node N1 via the first transistor T1. Thus, the third node N3, the second node N2, and the first node N1 may be initialized with the reference voltage Vref, the initialization voltage Vint, and the high power voltage ELVDD, respectively. As described above, in the initialization period IP of the pixel circuit 100, a voltage of the gate electrode of the third transistor T3 may become the reference voltage Vref, a voltage of the first electrode (e.g., source electrode) of the third transistor T3 may become the high power voltage ELVDD, and a voltage of the second electrode (e.g., drain electrode) of the third transistor T3 may become the initialization voltage Vint.

FIGS. 6A and 6B show the threshold voltage compensation period CP of the pixel circuit 100. As illustrated in FIG. 6A, in the threshold voltage compensation period CP of the pixel circuit 100, the bias scan signal SCAN-BIAS may have a logical 'low' level, the data scan signal SCAN-DATA may have a logical 'high' level, the first emission control signal EM1 may have a logical 'high' level, and the second emission control signal EM2 may have a logical 'low' level.

Thus, as illustrated in FIG. 6B, the first transistor T1 may be turned off (e.g., indicated by OFF) based on the first emission control signal EM1 having a logical 'high' level, the second transistor T2 may be turned on (e.g., indicated by ON) based on the second emission control signal EM2 having a logical 'low' level, the fourth transistor T4 may be turned on (e.g., indicated by ON) based on the bias scan signal SCAN-BIAS having a logical 'low' level, the fifth transistor T5 may be turned on (e.g., indicated by ON) based on the bias scan signal SCAN-BIAS having a logical 'low' level, and the sixth transistor T6 may be turned off (e.g., indicated by OFF) based on the data scan signal SCAN-DATA having a logical 'high' level.

As a result, in the threshold voltage compensation period CP of the pixel circuit 100, the reference voltage Vref may be transferred to the third node N3 via the fifth transistor T5, and the initialization voltage Vint may be transferred to the second node N2 via the fourth transistor T4. However, because the first transistor T1 is turned off, the high power voltage ELVDD may not be transferred to the first node N1. Thus, a voltage of the first node N1 may become a voltage (e.g., Vref−Vth) generated by subtracting a threshold voltage Vth of the third transistor T3 from the reference voltage Vref (e.g., referred to as a source-following threshold voltage compensation operation). Here, because the threshold voltage Vth of the third transistor T3 as a PMOS transistor is negative, the voltage (e.g., Vref−Vth) of the first node N1 may be substantially higher than the reference voltage Vref.

As described above, in the threshold voltage compensation period CP of the pixel circuit 100, a voltage of the gate electrode of the third transistor T3 may become the reference voltage Vref, a voltage of the first electrode (e.g., source electrode) of the third transistor T3 may become the voltage (e.g., Vref−Vth) generated by subtracting the threshold voltage Vth of the third transistor T3 from the reference voltage Vref, and a voltage of the second electrode (e.g., drain electrode) of the third transistor T3 may become the initialization voltage Vint.

FIGS. 7A and 7B show the data scan period SP of the pixel circuit 100. As illustrated in FIG. 7A, in the data scan period SP of the pixel circuit 100, the bias scan signal SCAN-BIAS may have a logical 'high' level, the data scan signal SCAN-DATA may have a logical 'low' level, the first emission control signal EM1 may have a logical 'high' level, and the second emission control signal EM2 may have a logical 'high' level. Thus, as illustrated in FIG. 7B, the first transistor T1 may be turned off (e.g., indicated by OFF) based on the first emission control signal EM1 having a logical 'high' level, the second transistor T2 may be turned off (e.g., indicated by OFF) based on the second emission control signal EM2 having a logical 'high' level, the fourth transistor T4 may be turned off (e.g., indicated by OFF) based on the bias scan signal SCAN-BIAS having a logical 'high' level, the fifth transistor T5 may be turned off (e.g., indicated by OFF) based on the bias scan signal SCAN-BIAS having a logical 'high' level, and the sixth transistor T6 may be turned on (e.g., indicated by ON) based on the data scan signal SCAN-DATA having a logical 'low' level. As a result, in the data scan period SP of the pixel circuit 100, the data signal DATA may be transferred to the third node N3 via the sixth transistor T6.

Here, as the data signal DATA is transferred to the third node N3, a voltage change (e.g., DATA−Vref) of the third node N3 may affect the voltage (e.g., Vref−Vth) of the first node N1. For example, because the first transistor T1 is turned off in the data scan period SP of the pixel circuit 100, the storage capacitor C1 and the hold capacitor C2 may exist between the high power voltage ELVDD and the third node N3. Hence, the voltage change (e.g., DATA−Vref) of the third node N3 may be distributed by the storage capacitor C1 and the hold capacitor C2, and thus only a portion (e.g., C1×(DATA−Vref)÷(C1+C2)) of the voltage change (e.g., DATA−Vref) of the third node N3 may be reflected in the voltage (e.g., Vref−Vth) of the first node N1. That is, the portion (e.g., C1×(DATA−Vref)÷(C1+C2)) of the voltage change (e.g., DATA−Vref) of the third node N3 may be added to the voltage (e.g., Vref−Vth) of the first node N1.

As a result, in the data scan period SP of the pixel circuit 100, a voltage of the gate electrode of the third transistor T3 may become the data voltage DATA, a voltage of the first electrode (e.g., source electrode) of the third transistor T3 may become a changed voltage (e.g., C1×(DATA−Vref)÷(C1+C2)+Vref−Vth) of the first node N1, and a voltage of the second electrode (e.g., drain electrode) of the third transistor T3 may become the initialization voltage Vint.

FIGS. 8A and 8B show the emission preparation period EIP of the pixel circuit 100. As illustrated in FIG. 8A, in the emission preparation period EIP of the pixel circuit 100, the bias scan signal SCAN-BIAS may have a logical 'high' level, the data scan signal SCAN-DATA may have a logical 'high' level, the first emission control signal EM1 may have a logical 'low' level, and the second emission control signal EM2 may have a logical 'high' level.

Thus, as illustrated in FIG. 8B, the first transistor T1 may be turned on (e.g., indicated by ON) based on the first emission control signal EM1 having a logical 'low' level, the second transistor T2 may be turned off (e.g., indicated by OFF) based on the second emission control signal EM2 having a logical 'high' level, the fourth transistor T4 may be turned off (e.g., indicated by OFF) based on the bias scan signal SCAN-BIAS having a logical 'high' level, the fifth transistor T5 may be turned off (e.g., indicated by OFF) based on the bias scan signal SCAN-BIAS having a logical 'high' level, and the sixth transistor T6 may be turned off (e.g., indicated by OFF) based on the data scan signal SCAN-DATA having a logical 'high' level.

As a result, in the emission preparation period EIP of the pixel circuit 100, only the storage capacitor C1 may exist between the high power voltage ELVDD and the third node N3 because the first transistor T1 is turned on. Thus, when the high power voltage ELVDD is applied to the first node N1 as the first transistor T1 is turned on, a voltage change (e.g., ELVDD−(C1×(DATA−Vref)÷(C1+C2)+Vref−Vth)) of the first node N1 may be caused. Here, the voltage change (e.g., ELVDD−(C1×(DATA−Vref)÷(C1+C2)+Vref−Vth)) of the first node N1 may be directly reflected in a voltage (e.g., DATA) of the third node N3. That is, the voltage change (e.g., ELVDD−(C1×(DATA−Vref)÷(C1+C2)+Vref−Vth)) of the first node N1 may be added to the voltage (e.g., DATA) of the third node N3. As a result, in the emission preparation period EIP of the pixel circuit 100, a voltage of the gate electrode of the third transistor T3 may become a changed voltage (e.g., ELVDD−C1×(DATA−Vref)÷(C1+C2)−Vref+Vth+DATA) of the third node N3, a voltage of the first electrode (e.g., source electrode) of the third transistor T3 may become the high power voltage ELVDD, and a voltage of the second electrode (e.g., drain electrode) of the third transistor T3 may become the initialization voltage Vint.

FIGS. 9A and 9B show the emission period EP of the pixel circuit 100. As illustrated in FIG. 9A, in the emission period EP of the pixel circuit 100, the bias scan signal SCAN-BIAS may have a logical 'high' level, the data scan signal SCAN-DATA may have a logical 'high' level, the first emission control signal EM1 may have a logical 'low' level, and the second emission control signal EM2 may have a logical 'low' level. Thus, as illustrated in FIG. 9B, the first transistor T1 may be turned on (e.g., indicated by ON) based on the first emission control signal EM1 having a logical 'low' level, the second transistor T2 may be turned on (e.g., indicated by ON) based on the second emission control signal EM2 having a logical 'low' level, the fourth transistor T4 may be turned off (e.g., indicated by OFF) based on the bias scan signal SCAN-BIAS having a logical 'high' level, the fifth transistor T5 may be turned off (e.g., indicated by OFF) based on the bias scan signal SCAN-BIAS having a logical 'high' level, and the sixth transistor T6 may be turned off (e.g., indicated by OFF) based on the data scan signal SCAN-DATA having a logical 'high' level. Here, because a current Ioled flowing through the organic light emitting diode OLED is proportional to the square of a voltage generated by subtracting the threshold voltage Vth of the third transistor T3 from a gate-source voltage Vgs of the third transistor T3, the current Ioled flowing through the organic light emitting diode OLED may not be affected by the threshold voltage Vth of the third transistor T3 as shown in [Equation 1] below.

$$
\begin{aligned}
Ioled &= K\times(Vgs-Vth)^{\wedge}2 = K\times(Vg-Vs-Vth)^{\wedge}2 = \\
&K\times(ELVDD-C1\times(\mathrm{DATA}-Vref)\div(C1+C2)- \\
&Vref+Vth+\mathrm{DATA}-ELVDD-Vth)^{\wedge}2 = \\
&K\times(\mathrm{DATA}-Vref-C1\times(\mathrm{DATA}-Vref)\div \\
&(C1+C2))^{\wedge}2,
\end{aligned}
\qquad \text{[Equation 1]}
$$

where K denotes a constant, Vg denotes a voltage of the gate electrode of the third transistor T3, and Vs denotes a voltage of the source electrode of the third transistor T3.

As described above, the pixel circuit 100 may sequentially determine the initialization period IP, the threshold voltage compensation period CP, the data scan period SP, the emission preparation period EIP, and the emission period EP based on the bias scan signal SCAN-BIAS, the data scan signal SCAN-DATA, the first emission control signal EM1, and the second emission control signal EM2 and may relatively easily adjust a length of the initialization period IP, a length of the threshold voltage compensation period CP, a length of the data scan period SP, a length of the emission preparation period EIP, and a length of the emission period EP based on timings of the bias scan signal SCAN-BIAS, the data scan signal SCAN-DATA, the first emission control signal EM1, and the second emission control signal EM2.

That is, the pixel circuit 100 may relatively easily adjust a compensation time for which the threshold voltage compensation operation is performed. Thus, the organic light emitting display device including the pixel circuits 100 may sufficiently perform the threshold voltage compensation operation for the pixel circuits 100 even when a length of one horizontal period 1H becomes shorter as a size of the organic light emitting display device becomes bigger (e.g., as resolution of the organic light emitting display device becomes higher). As a result, the organic light emitting display device including the pixel circuits 100 may effectively prevent image-quality degradation due to threshold voltage deviation of the driving transistors (e.g., the third transistors T3) included in the pixel circuits 100, so that the organic light emitting display device including the pixel circuits 100 may display a high-quality image.

Figure 10:
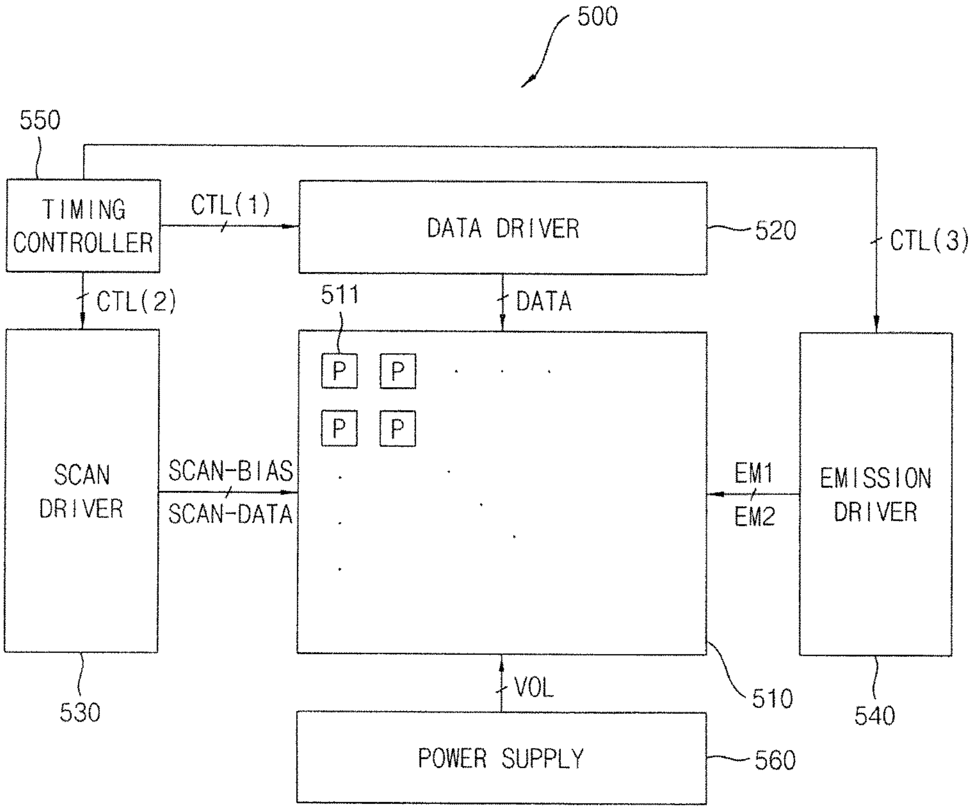
FIG. 10 is a block diagram illustrating an organic light emitting display device according to some example embodiments of the present invention.

FIG. 10 is a block diagram illustrating an organic light emitting display device according to some example embodiments of the present invention.

Referring to FIG. 10, the organic light emitting display device 500 may include a display panel 510, a data driver 520, a scan driver 530, an emission driver 540, a timing controller 550, and a power supply 560.

The display panel 510 may include a plurality of pixel circuits 511. Here, each of the pixel circuits 511 operates based on sequential operation periods, namely an initialization period, a threshold voltage compensation period, a data scan period, an emission preparation period, and an emission period. In some example embodiments, the pixel circuits 511 may be arranged in a matrix form in the display panel 510. The display panel 510 may be connected to the data driver 520 via data-lines. The display panel 510 may be connected to the scan driver 530 via scan-lines (e.g., first scan-lines for transferring a bias scan signal SCAN-BIAS and second scan-lines for transferring a data scan signal SCAN-DATA). The display panel 510 may be connected to the emission driver 540 via emission control-lines (e.g., first emission control-lines for transferring a first emission control signal EM1 and second emission control-lines for transferring a second emission control signal EM2). The data driver 520 may provide a data signal DATA (e.g., a data voltage) to the display panel 510 via the data-lines.

The scan driver 530 may provide the bias scan signal SCAN-BIAS and the data scan signal SCAN-DATA to the pixel circuits 511 via the scan-lines, where logical levels of the bias scan signal SCAN-BIAS and the data scan signal SCAN-DATA are determined respectively according to the operation periods. Although one scan driver 530 is illustrated in FIG. 10, in some example embodiments, the scan driver 530 may be divided into a first scan driver for providing the bias scan signal SCAN-BIAS and a second scan driver for providing the data scan signal SCAN-DATA.

The emission driver 540 may provide the first emission control signal EM1 and the second emission control signal EM2 to the pixel circuits 511 via the emission control-lines, where logical levels of the first emission control signal EM1 and the second emission control signal EM2 are determined respectively according to the operation periods. Although one emission driver 540 is illustrated in FIG. 10, in some example embodiments, the emission driver 540 may be divided into a first emission driver for providing the first emission control signal EM1 and a second emission driver for providing the second emission control signal EM2.

The timing controller 550 may generate control signals CTL(1), CTL(2), and CTL(3) to control the data driver 520, the scan driver 530, and the emission driver 540. The power supply 560 may supply the display panel 510 with voltages VOL for operations of the pixel circuits 511. For example, the voltages VOL may include a reference voltage, an initialization voltage, a high power voltage, and a low power voltage.

As described above, each of the pixel circuits 511 included in the display panel 510 may sequentially determine the initialization period, the threshold voltage compensation period, the data scan period, the emission preparation period, and the emission period based on the bias scan signal SCAN-BIAS, the data scan signal SCAN-DATA, the first emission control signal EM1, and the second emission control signal EM2 and may relatively easily adjust a length of the initialization period, a length of the threshold voltage compensation period, a length of the data scan period, a length of the emission preparation period, and a length of the emission period based on timings of the bias scan signal SCAN-BIAS, the data scan signal SCAN-DATA, the first emission control signal EM1, and the second emission control signal EM2.

For this operation, the pixel circuit 511 may include a first transistor, a second transistor, a third transistor, an organic light emitting diode, a fourth transistor, a fifth transistor, a sixth transistor, a storage capacitor, and a hold capacitor. The first transistor may include a gate electrode to which the first emission control signal EM1 is applied, a first electrode connected to the high power voltage, and a second electrode connected to a first node.

The second transistor may include a gate electrode to which the second emission control signal EM2 is applied, a first electrode connected to a second electrode of the third transistor, and a second electrode connected to a second node. The third transistor may include a gate electrode connected to a third node, a first electrode connected to the first node, and a second node connected to the first electrode of the second transistor.

The organic light emitting diode may include an anode connected to the second node and a cathode connected to the low power voltage. The fourth transistor may include a gate electrode to which the bias scan signal SCAN-BIAS is applied, a first electrode connected to an initialization voltage, and a second electrode connected to the second node. The fifth transistor may include a gate electrode to which the bias scan signal SCAN-BIAS is applied, a first electrode connected to a reference voltage, and a second electrode connected to the third node.

The sixth transistor may include a gate electrode to which the data scan signal SCAN-DATA is applied, a first electrode to which the data signal DATA is applied, and a second electrode connected to the third node. The storage capacitor may be connected between the first node and the third node. The hold capacitor may be connected between the high power voltage and the first node.

For example, in the initialization period of the pixel circuit 511, the bias scan signal SCAN-BIAS may have a logical 'low' level, the data scan signal SCAN-DATA may have a logical 'high' level, the first emission control signal EM1 may have a logical 'low' level, and the second emission control signal EM2 may have a logical 'low' level. Thus, in the initialization period of the pixel circuit 511, the first transistor, the second transistor, the fourth transistor, and the fifth transistor may be turned on, and the sixth transistor may be turned off.

Subsequently, in the threshold voltage compensation period of the pixel circuit 511, the bias scan signal SCAN-BIAS may have a logical 'low' level, the data scan signal SCAN-DATA may have a logical 'high' level, the first emission control signal EM1 may have a logical 'high' level, and the second emission control signal EM2 may have a logical 'low' level. Thus, in the threshold voltage compensation period of the pixel circuit 511, the second transistor, the fourth transistor, and the fifth transistor may be turned on, and the first transistor and the sixth transistor may be turned off.

Next, in the data scan period of the pixel circuit 511, the bias scan signal SCAN-BIAS may have a logical 'high' level, the data scan signal SCAN-DATA may have a logical 'low' level, the first emission control signal EM1 may have a logical 'high' level, and the second emission control signal EM2 may have a logical 'high' level. Thus, in the data scan period of the pixel circuit 511, the first transistor, the second transistor, the fourth transistor, and the fifth transistor may be turned off, and the sixth transistor may be turned on.

Subsequently, in the emission preparation period of the pixel circuit 511, the bias scan signal SCAN-BIAS may have a logical 'high' level, the data scan signal SCAN-DATA may have a logical 'high' level, the first emission control signal EM1 may have a logical 'low' level, and the second emission control signal EM2 may have a logical 'high' level.

Thus, in the emission preparation period of the pixel circuit 511, the first transistor may be turned on, and the second transistor, the fourth transistor, the fifth transistor, and the sixth transistor may be turned off. Next, in the emission period of the pixel circuit 511, the bias scan signal SCAN-BIAS may have a logical 'high' level, the data scan signal SCAN-DATA may have a logical 'high' level, the first emission control signal EM1 may have a logical 'low' level, and the second emission control signal EM2 may have a logical 'low' level. Thus, in the emission period of the pixel circuit 511, the first transistor and the second transistor may be turned on, and the fourth transistor, the fifth transistor, and the sixth transistor may be turned off. In brief, the organic light emitting display device 500 may include the pixel circuits 511 each having a structure in which a compensation time for which the threshold voltage compensation operation is performed can be relatively easily adjusted, so that the organic light emitting display device 500 may provide a high-quality image to a viewer (or, user).

Figure 11:
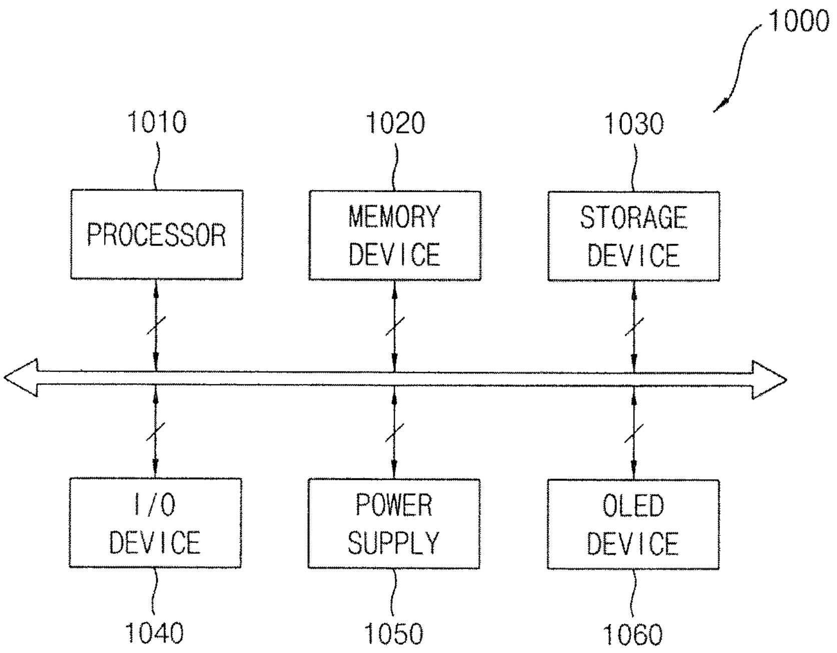
FIG. 11 is a block diagram illustrating an electronic device according to some example embodiments of the present invention.
Figure 12A:
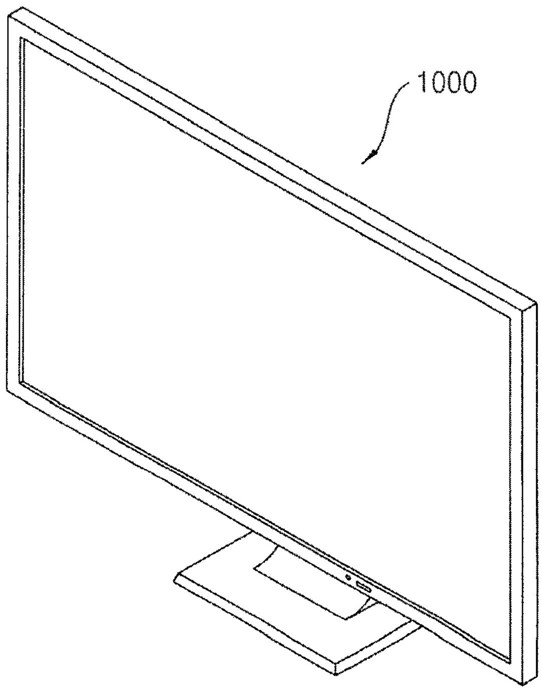
FIG. 12A is a diagram illustrating an example in which the electronic device of FIG. 11 is implemented as a television.
Figure 12B:
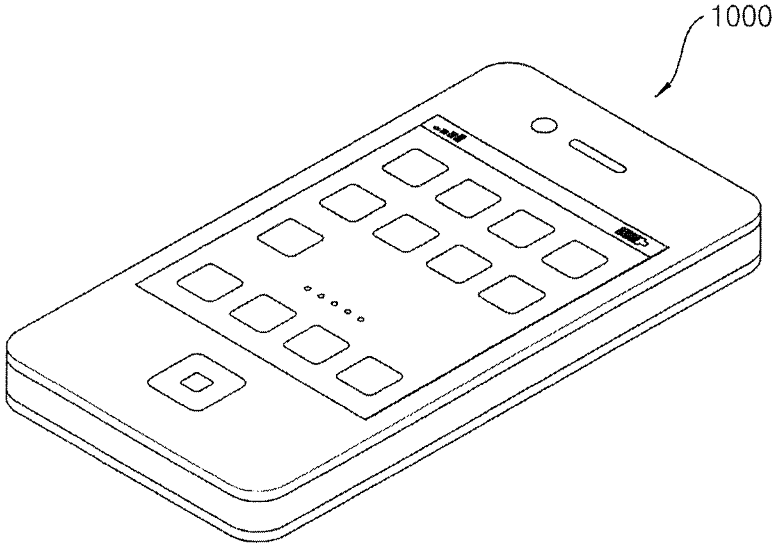
FIG. 12B is a diagram illustrating an example in which the electronic device of FIG. 11 is implemented as a smartphone.

FIG. 11 is a block diagram illustrating an electronic device according to example embodiments. FIG. 12A is a diagram illustrating an example in which the electronic device of FIG. 11 is implemented as a television. FIG. 12B is a diagram illustrating an example in which the electronic device of FIG. 11 is implemented as a smart-phone.

Referring to FIGS. 11 through 12B, the electronic device 1000 may include a processor 1010, a memory device 1020, a storage device 1030, an input/output (I/O) device 1040, a power supply 1050, and an organic light emitting display device 1060. Here, the organic light emitting display device 1060 may be the organic light emitting display device 500 of FIG. 10. In addition, the electronic device 1000 may further include a plurality of ports for communicating with a video card, a sound card, a memory card, a universal serial bus (USB) device, other electronic devices, etc. In an example embodiment, as illustrated in FIG. 12A, the electronic device 1000 may be implemented as the television. In another example embodiment, as illustrated in FIG. 12B, the electronic device 1000 may be implemented as the smart-phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD), etc.

The processor 1010 may perform various computing functions. The processor 1010 may be a microprocessor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 1030 may include a solid state drive (SSD) device, a hard disk drive (HDD) device, a CD-ROM device, etc. The I/O device 1040 may include an input device such as a keyboard, a keypad, a touchpad, a touch-screen, a mouse device, etc, and an output device such as a printer, a speaker, etc. The power supply 1050 may provide power for operations of the electronic device 1000.

The organic light emitting display device 1060 may communicate with other components via the buses or other communication links. In some example embodiments, the organic light emitting display device 1060 may be included in the I/O device 1040. As described above, the organic light emitting display device 1060 may include a plurality of pixel circuits. Here, each of the pixel circuits may sequentially determine an initialization period, a threshold voltage compensation period, a data scan period, an emission preparation period, and an emission period based on a bias scan signal, a data scan signal, a first emission control signal, and a second emission control signal and may relatively easily adjust a length of the initialization period, a length of the threshold voltage compensation period, a length of the data scan period, a length of the emission preparation period, and a length of the emission period based on timings of the bias scan signal, the data scan signal, the first emission control signal, and the second emission control signal. Thus, the organic light emitting display device 1060 may display (or, output) a high-quality image.

To this end, the organic light emitting display device 1060 may include a display panel, a scan driver, a data driver, a scan driver, an emission driver, a timing controller, and a power supply. The display panel may include the pixel circuits that operate based on sequential operation periods, namely, the initialization period, the threshold voltage compensation period, the data scan period, the emission preparation period, and the emission period. The data driver may provide the data signal to the pixel circuits. The scan driver may provide the bias scan signal and the data scan signal to the pixel circuits, where logical levels of the bias scan signal and the data scan signal are determined respectively according to the operation periods. The emission driver may provide the first emission control signal and the second emission control signal to the pixel circuits, where logical levels of the first emission control signal and the second emission control signal are determined respectively according to the operation periods. The timing controller may control the data driver, the scan driver, and the emission driver. The power supply may provide the reference voltage, the initialization voltage, the high power voltage, and the low power voltage to the pixel circuits.

Each pixel circuit of the organic light emitting display device 1060 may include a first transistor, a second transistor, a third transistor, an organic light emitting diode, a fourth transistor, a fifth transistor, a sixth transistor, a storage capacitor, and a hold capacitor. The first transistor may include a gate electrode to which the first emission control signal is applied, a first electrode connected to the high power voltage, and a second electrode connected to a first node. The second transistor may include a gate electrode to which the second emission control signal is applied, a first electrode connected to a second electrode of the third transistor, and a second electrode connected to a second node. The third transistor may include a gate electrode connected to a third node, a first electrode connected to the first node, and a second node connected to the first electrode of the second transistor. The organic light emitting diode may include an anode connected to the second node and a cathode connected to the low power voltage. The fourth transistor may include a gate electrode to which the bias scan signal is applied, a first electrode connected to the initialization voltage, and a second electrode connected to the second node. The fifth transistor may include a gate electrode to which the bias scan signal is applied, a first electrode connected to the reference voltage, and a second electrode connected to the third node. The sixth transistor may include a gate electrode to which the data scan signal is applied, a first electrode to which the data signal is applied, and a second electrode connected to the third node. The storage capacitor may be connected between the first node and the third node. The hold capacitor may be connected between the high power voltage and the first node. Because the organic light emitting display device 1060 is described above, duplicated description will not be repeated.

The present invention may be applied to an organic light emitting display device and an electronic device including the organic light emitting display device. For example, the present invention may be applied to a cellular phone, a smart phone, a video phone, a smart pad, a smart watch, a tablet PC, a car navigation system, a television, a computer monitor, a laptop, a head mounted display, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and aspects of the present invention. Accordingly, all such modifications are intended to be included within the scope of the present invention as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and their equivalents.

What is claimed is:

1. A pixel circuit comprising:

a first transistor comprising a gate electrode configured to receive a first emission control signal, a first electrode connected to a high power voltage, and a second electrode connected to a first node;

a second transistor comprising a gate electrode configured to receive a second emission control signal, a first electrode, and a second electrode connected to a second node;

a third transistor comprising a gate electrode connected to a third node, a first electrode connected to the first node, and a second electrode connected to the first electrode of the second transistor;

an organic light emitting diode comprising an anode connected to the second node and a cathode connected to a low power voltage;

a fourth transistor comprising a gate electrode configured to receive a bias scan signal, a first electrode connected to an initialization voltage, and a second electrode connected to the second node;

a fifth transistor comprising a gate electrode configured to receive the bias scan signal, a first electrode connected to a reference voltage, and a second electrode connected to the third node, wherein the initialization voltage and the reference voltage are applied to the second node and the third node in response to the bias scan signal;

a sixth transistor comprising a gate electrode configured to receive a data scan signal, a first electrode configured to receive a data signal, and a second electrode connected to the third node;

a storage capacitor between the first node and the third node; and a hold capacitor between the high power voltage and the first node.

2. The pixel circuit of claim 1, wherein an initialization period, a threshold voltage compensation period, a data scan period, an emission preparation period, and an emission period are sequentially determined based on the bias scan signal, the data scan signal, the first emission control signal, and the second emission control signal, and wherein a length of the initialization period, a length of the threshold voltage compensation period, a length of the data scan period, a length of the emission preparation period, and a length of the emission period are adjusted based on timings of the bias scan signal, the data scan signal, the first emission control signal, and the second emission control signal.

3. The pixel circuit of claim 2, wherein the first through sixth transistors are p-type metal oxide semiconductor (PMOS) transistors.

4. The pixel circuit of claim 3, wherein the bias scan signal has a logical 'low' level, the data scan signal has a logical 'high' level, the first emission control signal has a logical 'low' level, and the second emission control signal has a logical 'low' level in the initialization period.

5. The pixel circuit of claim 4, wherein the first transistor, the second transistor, the fourth transistor, and the fifth transistor are configured to be turned on and the sixth transistor is configured to be turned off in the initialization period.

6. The pixel circuit of claim 3, wherein the bias scan signal has a logical 'low' level, the data scan signal has a logical 'high' level, the first emission control signal has a logical 'high' level, and the second emission control signal has a logical 'low' level in the threshold voltage compensation period.

7. The pixel circuit of claim 6, wherein the second transistor, the fourth transistor, and the fifth transistor are configured to be turned on and the first transistor and the sixth transistor are configured to be turned off in the threshold voltage compensation period.

8. The pixel circuit of claim 3, wherein the bias scan signal has a logical 'high' level, the data scan signal has a logical 'low' level, the first emission control signal has a logical 'high' level, and the second emission control signal has a logical 'high' level in the data scan period.

9. The pixel circuit of claim 8, wherein the first transistor, the second transistor, the fourth transistor, and the fifth transistor are configured to be turned off and the sixth transistor is configured to be turned on in the data scan period.

10. The pixel circuit of claim 3, wherein the bias scan signal has a logical 'high' level, the data scan signal has a logical 'high' level, the first emission control signal has a logical 'low' level, and the second emission control signal has a logical 'high' level in the emission preparation period.

11. The pixel circuit of claim 10, wherein the first transistor is configured to be turned on and the second transistor, the fourth transistor, the fifth transistor, and the sixth transistor are configured to be turned off in the emission preparation period.

12. The pixel circuit of claim 3, wherein the bias scan signal has a logical 'high' level, the data scan signal has a logical 'high' level, the first emission control signal has a logical 'low' level, and the second emission control signal has a logical 'low' level in the emission period.

13. The pixel circuit of claim 12, wherein the first transistor and the second transistor are configured to be turned on and the fourth transistor, the fifth transistor, and the sixth transistor are configured to be turned off in the emission period.

14. An organic light emitting display device comprising:

a display panel comprising a plurality of pixel circuits, each of the pixel circuits operating based on sequential operation periods that include an initialization period, a threshold voltage compensation period, a data scan period, an emission preparation period, and an emission period;

a data driver configured to provide a data signal to the pixel circuits;

a scan driver configured to provide a bias scan signal and a data scan signal to the pixel circuits, logical levels of the bias scan signal and the data scan signal being determined respectively according to the operation periods;

an emission driver configured to provide a first emission control signal and a second emission control signal to the pixel circuits, logical levels of the first emission control signal and the second emission control signal being determined respectively according to the operation periods;

a timing controller configured to control the data driver, the scan driver, and the emission driver; and a power supply configured to supply the pixel circuits with a reference voltage, an initialization voltage, a high power voltage, and a low power voltage, wherein the reference voltage and the initialization voltage are applied to the pixel circuits in response to the bias scan signal, wherein a length of the initialization period, a length of the threshold voltage compensation period, a length of the data scan period, a length of the emission preparation period, and a length of the emission period are adjusted based on timings of the bias scan signal, the data scan signal, the first emission control signal, and the second emission control signal.

15. The display device of claim 14, wherein the each of the pixel circuits comprises:

a first transistor comprising a gate electrode configured to receive the first emission control signal, a first electrode connected to the high power voltage, and a second electrode connected to a first node;

a second transistor comprising a gate electrode configured to receive the second emission control signal, a first electrode, and a second electrode connected to a second node;

a third transistor comprising a gate electrode connected to a third node, a first electrode connected to the first node, and a second electrode connected to the first electrode of the second transistor;

an organic light emitting diode comprising an anode connected to the second node and a cathode connected to the low power voltage;

a fourth transistor comprising a gate electrode configured to receive the bias scan signal, a first electrode connected to the initialization voltage, and a second electrode connected to the second node;

a fifth transistor comprising a gate electrode configured to receive the bias scan signal, a first electrode connected to the reference voltage, and a second electrode connected to the third node;

a sixth transistor comprising a gate electrode configured to receive the data scan signal, a first electrode configured to receive the data signal, and a second electrode connected to the third node;

a storage capacitor between the first node and the third node; and a hold capacitor between the high power voltage and the first node, and wherein the first through sixth transistors are p-type metal oxide semiconductor (PMOS) transistors.

16. The display device of claim 15, wherein the bias scan signal has a logical 'low' level, the data scan signal has a logical 'high' level, the first emission control signal has a logical 'low' level, and the second emission control signal has a logical 'low' level in the initialization period.

17. The display device of claim 15, wherein the bias scan signal has a logical 'low' level, the data scan signal has a logical 'high' level, the first emission control signal has a logical 'high' level, and the second emission control signal has a logical 'low' level in the threshold voltage compensation period.

18. The display device of claim 15, wherein the bias scan signal has a logical 'high' level, the data scan signal has a logical 'low' level, the first emission control signal has a logical 'high' level, and the second emission control signal has a logical 'high' level in the data scan period.

19. The display device of claim 15, wherein the bias scan signal has a logical 'high' level, the data scan signal has a logical 'high' level, the first emission control signal has a logical 'low' level, and the second emission control signal has a logical 'high' level in the emission preparation period.

20. The display device of claim 15, wherein the bias scan signal has a logical 'high' level, the data scan signal has a logical 'high' level, the first emission control signal has a logical 'low' level, and the second emission control signal has a logical 'low' level in the emission period.

* * * * *